United States Patent [19]
Hines et al.

[11] Patent Number: 4,556,346
[45] Date of Patent: Dec. 3, 1985

[54] DRILL PRESS MOUNTING APPARATUS FOR BALANCING MACHINE

[75] Inventors: Gordon E. Hines; Jack H. Kerlin, both of Ann Arbor, Mich.

[73] Assignee: Hines Industries, Inc., Ann Arbor, Mich.

[21] Appl. No.: 521,141

[22] Filed: Sep. 16, 1983

Related U.S. Application Data

[62] Division of Ser. No. 253,288, Apr. 13, 1981, Pat. No. 4,406,164.

[51] Int. Cl.[4] ............................................. B23B 39/14
[52] U.S. Cl. ...................................... 408/88; 408/77; 408/237; 29/1 A
[58] Field of Search ................. 408/77, 88, 237, 2, 408/4, 46, 78; 29/1 A, 26 A, 26 B

[56] References Cited

U.S. PATENT DOCUMENTS

| 494,845 | 4/1893 | Collins | 408/237 X |
|---|---|---|---|
| 1,180,554 | 4/1916 | Stueber | 408/46 |
| 1,246,144 | 11/1917 | Nelson | 408/78 X |
| 1,676,206 | 7/1928 | Ratliff | 408/237 |
| 2,002,372 | 5/1935 | Greentree et al. | |
| 2,382,665 | 8/1945 | Riopelle et al. | |
| 2,405,474 | 8/1946 | Van Degrift | |
| 2,623,419 | 12/1952 | Wales | 408/88 X |
| 2,799,168 | 7/1957 | Federn et al. | |
| 2,945,402 | 7/1960 | Burg | 408/237 |
| 2,974,174 | 8/1960 | Lash | |
| 3,981,605 | 9/1976 | Wirsing | 408/88 |
| 4,063,461 | 12/1977 | Buzzi | |
| 4,108,566 | 8/1978 | Jones | 408/88 X |
| 4,250,555 | 2/1981 | Mitchell et al. | |
| 4,268,196 | 5/1981 | Harrow et al. | 408/78 X |

Primary Examiner—Z. R. Bilinsky
Attorney, Agent, or Firm—Emch, Schaffer, Schaub & Porcello

[57] ABSTRACT

A drill press mounting apparatus for use on a balancing machine having a longitudinally extending machine bed is disclosed. The drill press assembly is comprised of a first longitudinally extending guide path defined adjacent the machine bed and a second longitudinally extending guide path defined adjacent the machine bed parallel to the first guide path. A drill press is mounted for movement along the first and second guide paths and a friction stop is operatively connected between the drill press and the machine bed. The friction stop retards movement of the drill press with respect to the machine bed upon commencement of drill press operations.

5 Claims, 11 Drawing Figures

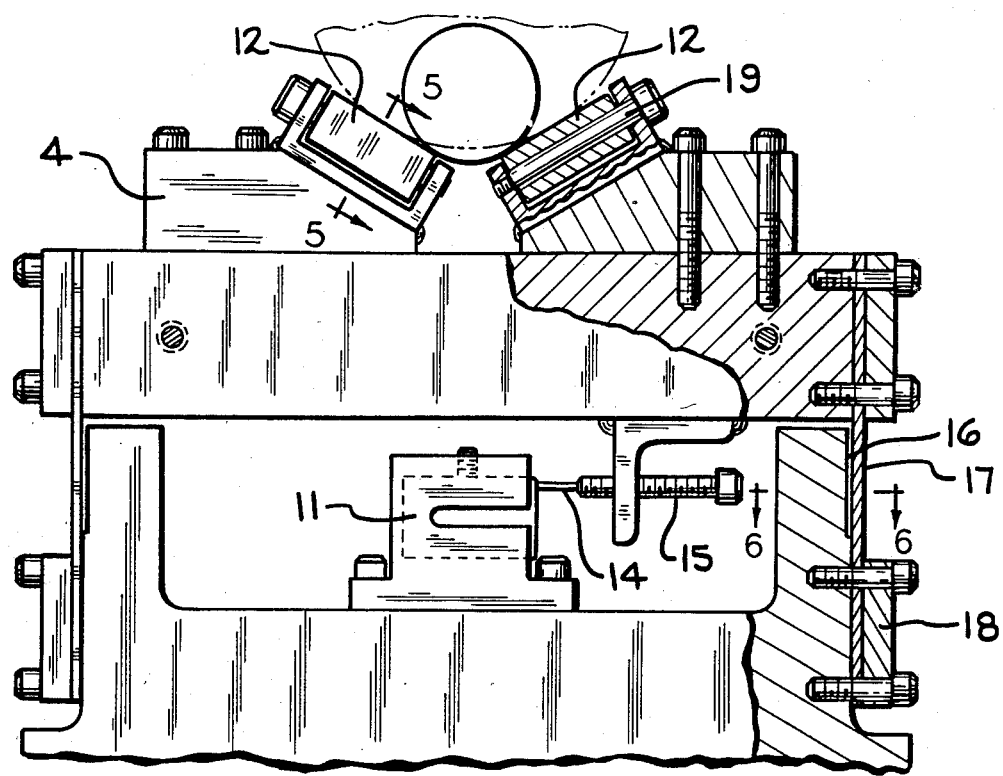
FIG. 2
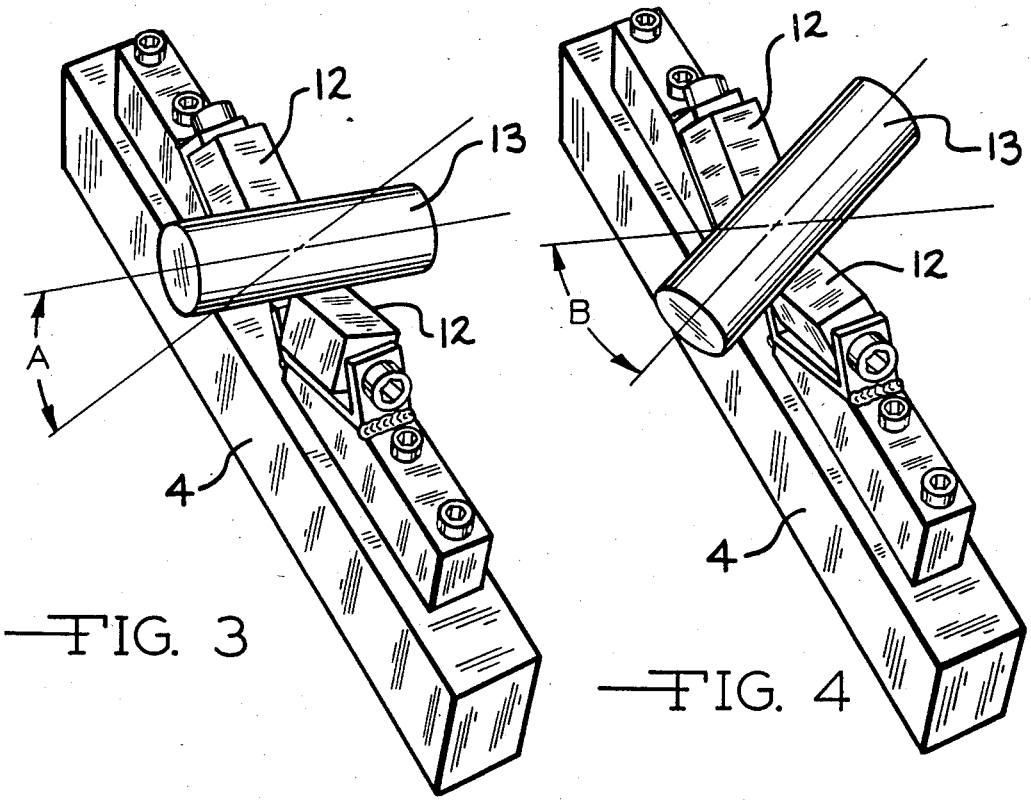
FIG. 3
FIG. 4

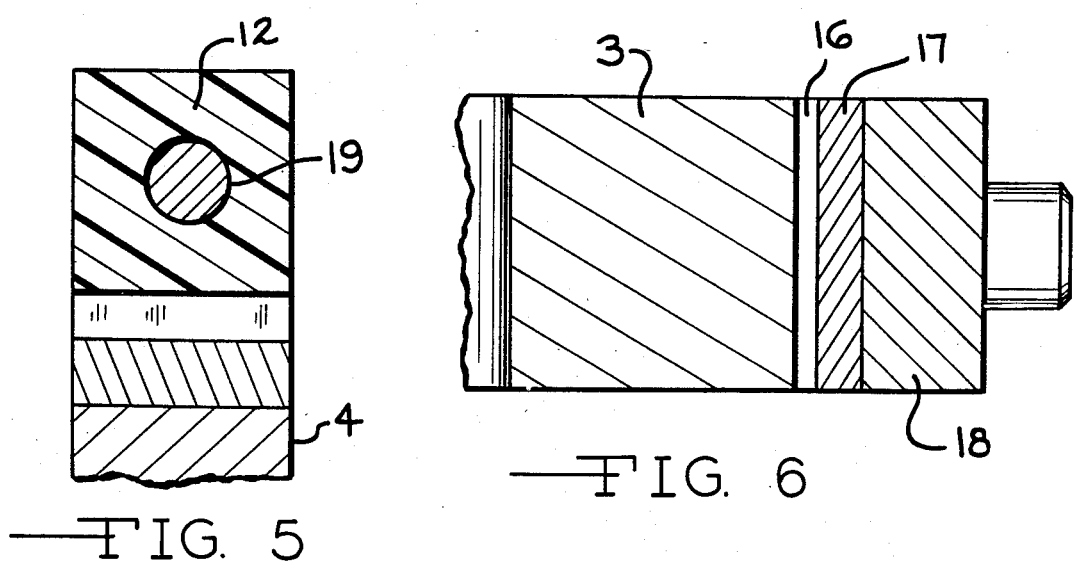
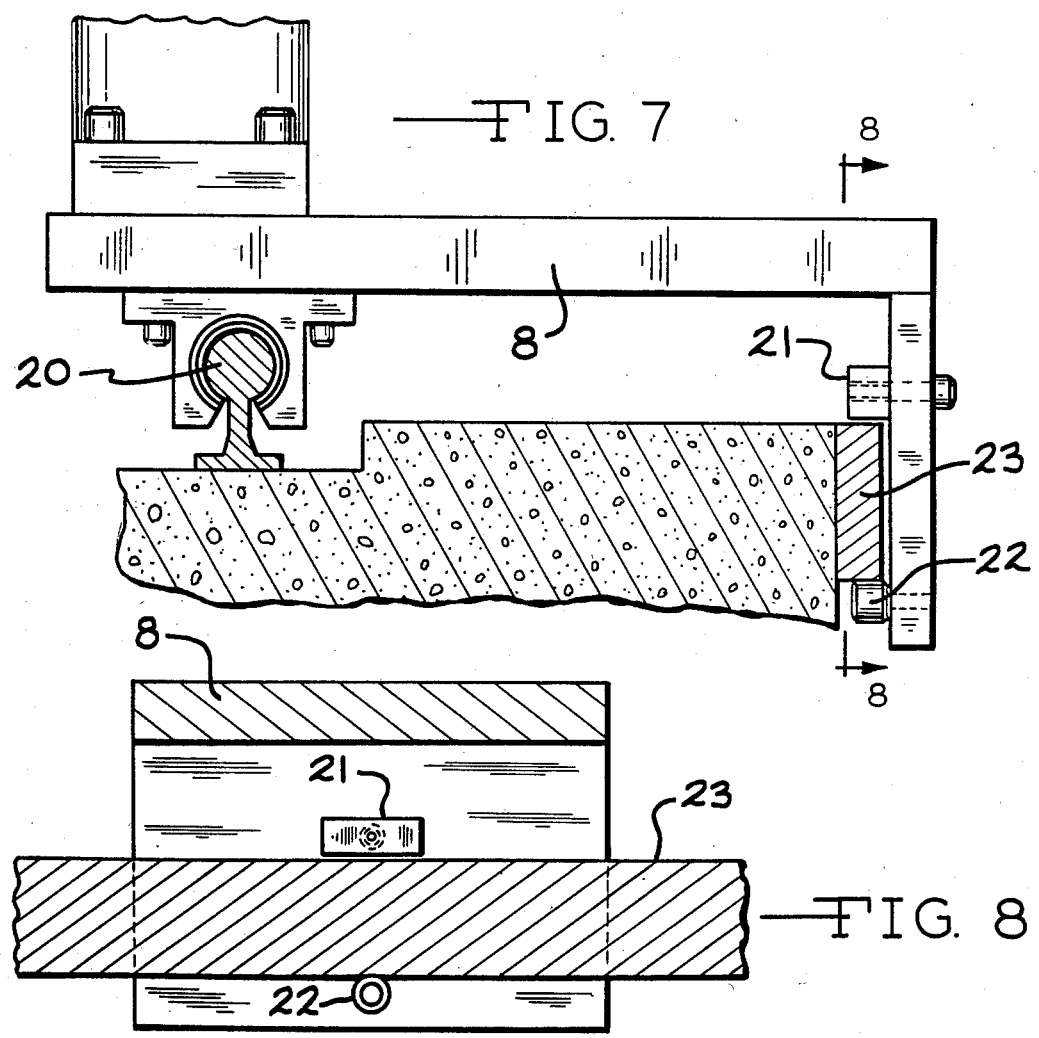

DRILL PRESS MOUNTING APPARATUS FOR BALANCING MACHINE

This application is a division of patent application Ser. No. 253,288 filed Apr. 13, 1981, now U.S. Pat. No. 4,406,164.

This invention pertains to a means of balancing rotatable elements. Although not so limited, the invention has particular application in the balancing of machine parts having integral journals such as crankshafts and motor armatures.

FIELD OF INVENTION

Horizontal balancing machines have been developed for quite some time taking many varied forms, yet all possessing certain problems in common.

A rotatable element to be balanced, hereafter simply called "workpiece" must be supported in the balancer on its own journals to allow rotation about a geometric axis determined by the journal surface. There are typically two means of supporting the journals: between ball bearing rollers or in "V" blocks. When rollers are used, it is required that they rotate with high precision with respect to radial runout to avoid describing a fluctuating axis of rotation other than that described by the journal surfaces. In addition, alignment of the rollers' axis parallel to the workpiece axis is critical in preventing axial thrust produced by the screwing tendency of rollers. "V" blocks eliminate the runout and axial thrust problems of rollers but introduce higher turning resistance due to friction. They also require self-aligning capability in order to distribute surface wear and unit loading in spite of workpiece misalignment. A further necessity for self-aligning properties is the reduction of torsional restraint on the journal that would adversly affect measurement of unbalance, particularly in 2-plane balancing applications.

Proper alignment of rollers is facilitated by a freely suspended bearing carrier in so-called "soft-bearing" balancing machines. Technological advances in recent years in measuring minute vibration displacements has made the "hard bearing" machine practical with its attendent advantages to the machine operator. Maintaining roller alignment in a hard bearing balancer presents greater difficulty. Crowned rollers must be used to allow torsional freedom, but the high, unit loading due to the point contact of the crown can sometimes damage journal surface finishes. A preferred approach in hard-bearing balancers is the "V" block journal support. An assortment of movable arms, end-thrust rollers, hinged joints, etc. have been devised to alleviate the problems associates with rollers and "V" blocks.

An area of concern common to all balancing machines is the provision of rotational position information to the instrumentation and machine operator alike. The vibration measuring device, hereafter "instrument", must receive a reference signal from the rotating workpiece with which to relate the vibration signal. These two signals combine to indicate location or angle of unbalance to the machine operator via some instrument display means, such as an angle meter or strobe light. The operator makes a balance correction at the indicated location relative to some reference point on the workpiece.

Targets, angle rings, strobe-illuminated reference marks and pointers have conventionally supplied such a reference point. The necessity of having to attach to various workpiece configurations compromises accuracy and ease of obtaining positional information. In many cases, workpiece rotational speed information is also required for proper instrument operation.

Balance corrections may be specified at any point along the workpiece axis. In most cases, the workpiece is removed from the balancer for correction process, such as grinding or drilling, then returned to the balancer for a balance check. Several course-to-fine corrections may require repeated loading and unloading of the balancer. This time-consuming method can be remedied by mounting the correction device, such as a drill press, directly on the balancer with the workpiece free to move along the workpiece axis to any point where correction is desired. In instances where this approach has been tried, complicated locking devices are employed to assure drill press stability during the drilling operation.

SUMMARY OF THE INVENTION

The present invention treats the several areas previously mentioned relating to radial and axial workpiece support, transmission of workpiece rotational position and speed, indication of unbalance location, and an on-machine unbalance correction method.

The balancing machine incorporating the improvements comprising this invention is of the hard-bearing type, although not necessarily limited thereto.

"V" block type journal supports are utilized. Where the opposing bearing faces of conventional "V" blocks are spatially fixed relative to one another, a novel feature of this invention is the independent and free positioning of opposing faces with a misaligned journal assuring continuous bearing contact. The movable opposing faces, or tilting pads, are pivoted in a manner as to permit rigidity and conduction of unbalance forces from the journal to the suspended bearing carrier.

Another aspect of this invention relates to maintaining axial positioning of the workpiece on the "V" block bearing. A small shaft mounted in bearings, radially and axially fixed thereby, oriented parallel and coincidental with the workpiece journal axis, communicates mechanically with an end of the workpiece via a radially flexible but axially rigid intermediate shaft. Any axial thrust acting on the workpiece is transmitted by the intermediate shaft to the fixed shaft thus axially restraining the workpiece while allowing radial freedom.

The mechanical attributes of this so-called end thrust device lend themselves to other useful functions comprising features of this invention. By fitting the above mentioned fixed shaft with a disc centered and free to rotate thereon, workpiece position reference and speed information may be transmitted electrically through the imposition of conventional encoder sensors from the rotating disc to the measuring instrument. In addition, the disc serves as a visual indicator to the machine operator of the location of workpiece unbalanced corresponding to angle information displayed or indicated by the instrument.

A further improvement of balancing machines encompassed by this invention is the mounting of a drill press on the balancer by means of a free moving slide configured to lock-up when a particular directional force produced by drilling is applied to the drill press slide. The slide moves along two parallel rails. One rail accommodates low friction linear bearings on the slide which are positioned as to support almost the entire drill press weight, and also serve to guide the slide along the track rigidly in two degrees of freedom. The third degree of freedom is maintained by the other track acting on a friction bearing surface on the slide. Because almost all weight force bears upon the free-moving linear bearing, this friction bearing surface presents only slight resistance to slide movement. But during a drilling operation, the force so developed acts to decrease the load on the linear bearings and increase the load on the friction bearing. This application of predetermined forces relative to bearing characteristics, location and loading forms an inherent automatic lock-up system in the drill press slide.

A BRIEF DESCRIPTION OF THE DRAWINGS

FIG. 2 is an end view showing the workpiece support and bearing assembly;

FIGS. 3 and 4 show the operation of the bearing support and bearing assembly;

FIG. 5 is an enlarged section view taken along lines 5—5 of FIG. 2;

FIG. 6 is on enlarged section view taken along lines 6—6 of FIG. 2;

FIG. 7 is an enlarged section view taken along lines 7—7 of FIG. 1 and showing the drill press munting;

FIG. 8 is a section view taken along lines 8—8 of FIG. 7;

DESCRIPTION OF PREFERRED EMBODIMENTS

Figure 1:
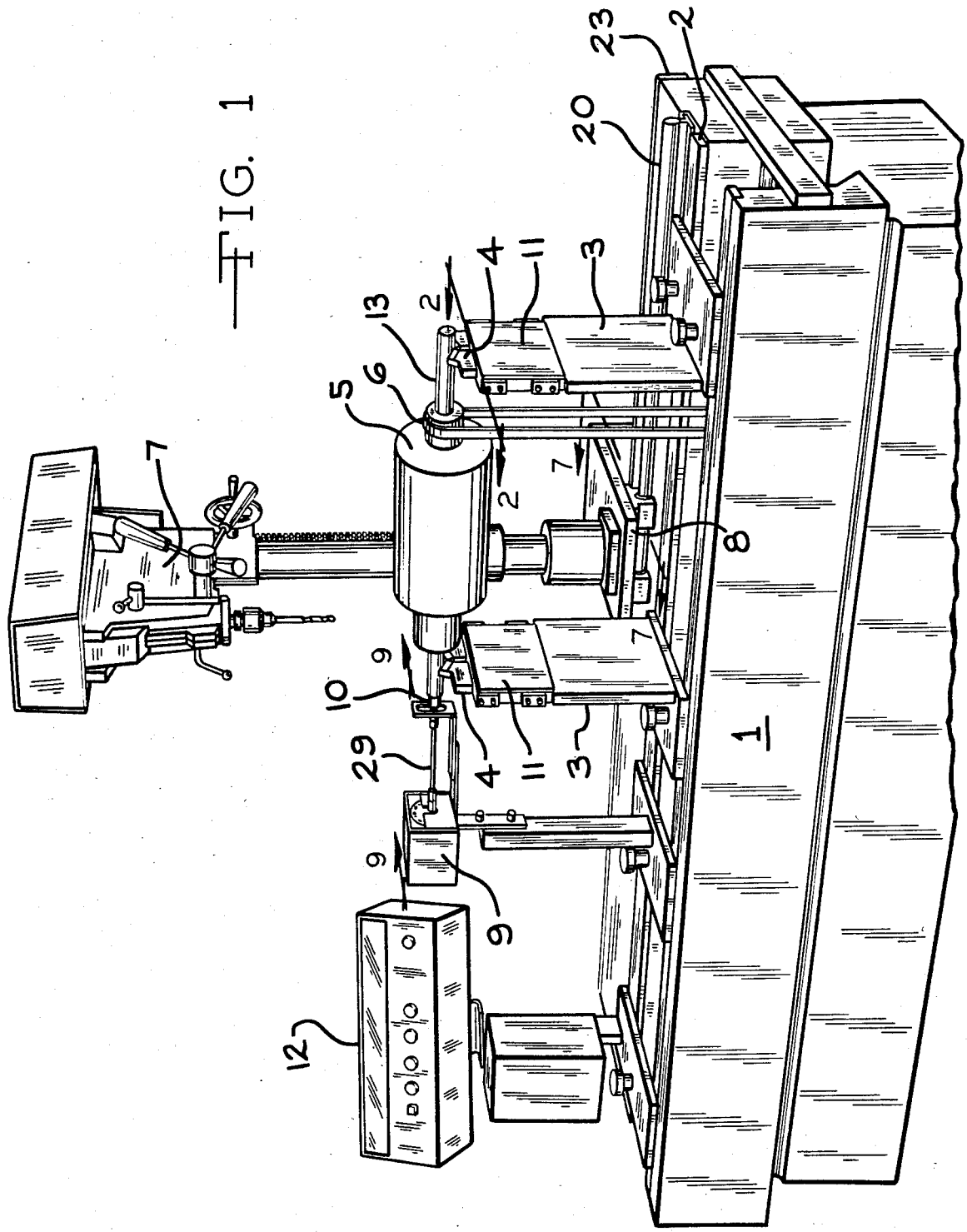
FIG. 1 is a perspective view of a balancing machine including a drill press.

The assembly of novel features incorporated in the presently preferred embodiment of the invention is shown in FIG. 1. An examination of FIG. 1 will develop a general understanding of the functions and advantages of the invention. Referring to FIG. 1, a concrete machine bed 1 supports two stanchions 3 which are free to slide on rails 2 to accommodate various length workpieces 5. Journals 13 of the workpiece 5 rest in "V" block bearing assemblies 4 attached by springs to the stanchions 3. Workpiece 5 is caused to rotate by motor-driven belt 6. Vibration from rotating workpiece 5 is transmitted to displacement transducers 11 (see FIG. 2) hidden from view by protective covers. Angle indicator 9 mounted to rails 2 is positioned thereon to allow attachment of magnet 10 to end of workpiece 5. Magnet 10 communicates via shaft 29 workpiece 5 rotation information and axial forces to angle indicator 9. Drill press 7 mounted on slide 8 transverse workpiece 5 axis on rails 20 and 23 secured to concrete machine bed 1.

Vibration and rotational information from transducers 11 and angle indicator 9 respectively is transmitted electrically to measuring instrument 12. Instrument 12 displays balance correction amount and location to the machine operator. Correction location is referenced with workpiece 5 by angle indicator 9.

Referring to FIG. 2, bearing assembly 4 incorporates two bearing blocks 12 free to rotate about shafts 19. The bearing surface in contact with the workpiece journal is generally parallel with the axis of shafts 19. FIGS. 3 and 4 show workpiece journal 13 axis free to tilt on blocks 12 through vertical angle A and horizontal angle B while maintaining full surface contact between journal 13 and blocks 12. If the angle of shafts 19 were both either horizontal or vertical, only vertical or horizontal angles respectively of journal 13 axis would be possible without losing full bearing contact. By orienting shaft 19 axis relative to one another at an angle between 0 and 180 degrees, preferably 90–120 degrees, both horizontal and vertical angle components become available permitting journal 13 axis misalignment in any direction without losing full bearing contact.

Section 5—5 of bearing block 12 of FIG. 2 is shown in FIG. 5. Block 12 is preferably fabricated of low friction bearing material such as nylon, teflon or oil impregnated bronze.

FIG. 2 clearly shows how "V" block assembly 4 accommodates journal 13 misalignment in the general rotational plane of blocks 12 while remaining fixed in the journal 13 rotational plane. Vibration forces are thereby transmitted directly by block 12 through shaft 19 to bearing assembly mount 4.

FIG. 2 also shows overall mounting of bearing assembly 4 through springs 17 to stationary stanchions 3 (FIG. 1). FIG. 6 shows in detail section 6—6 of FIG. 2 wherein spring 17 is clamped by block 18 to stanchion 3. Length and width of gap 16 constitutes the free bending range of spring 17.

Vibration transducer 11 mounted to stanchion 3 senses vibration on pin 14 in contact with adjusting screw 15 mounted to bearing assembly 4. Gap 16 between springs 17 and the stanchion provide a travel stop for bearing assembly 4 to prevent damage to transducer 11. Pin 14 is spring loaded by transducer 11 in order to maintain continuous contact with screw 15. Screw 15 positions pin 14 to its approximate travel midpoint allowing displacement to either side thereof as it arises from vibration of bearing assembly 4.

FIG. 7 shows drill press slide 8 mounted on rails 20 and 23. Conventional low-friction linear bearings on rail 20 supports most of the drill press weight and provides rigidity in two degrees of freedom. A low friction bearing 22 such as a cam follower and friction block 21 in close proximity or contact with rail 23 provide rotational rigidity about the axis of rail 20. The drill press is located on slide 8 such that the total assembly mass center is to the left side of rail 20 centerline. Consequently the right side of slide 8 is biased upward against rail 23 through bearing 22. In this mode the drill press freely moves along rails 20 and 23 on low-friction bearings. During a drilling operation torque is generated about the axis of rail 20 forcing friction block 21 down on rail 23. The friction force so developed restrains movement of the slide along the rails only while drilling is in progress. FIG. 8 shows section 8—8 with bearing 22 in contact with rail 23, friction block separated therefrom by a small gap, in the non-drilling mode.

Figure 9:
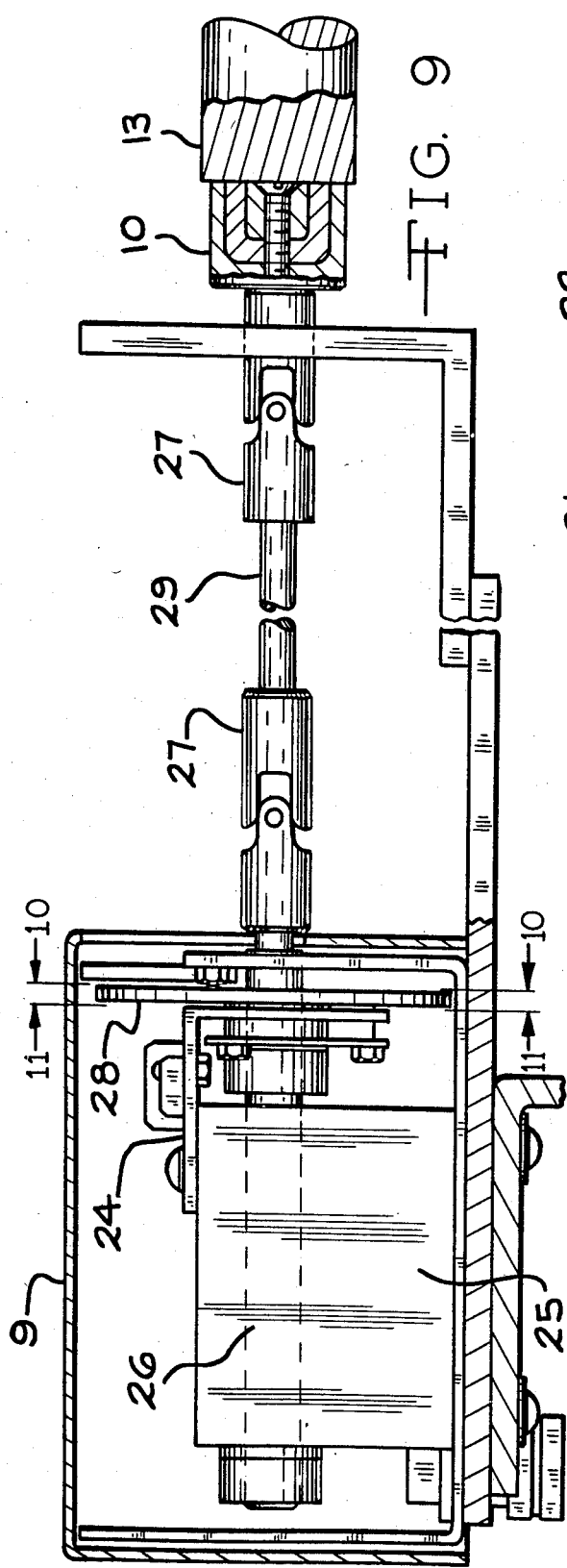
FIG. 9 is a side view of the angle indicator assembly.

FIG. 9 shows angle indicator assembly 9. Magnet 10 attached magnetically to end of journal 13 transmits rotation and axial thrust of the workpiece through universal joints 27 and shaft 29 to shaft 26. Shaft 26 is restrained in all degrees of freedom except rotational by bearing housing 25 mounted by a support post to rails 2 on machine bed 1. Universal joints 27 permit radial and angular freedom of magnet 10 while remaining axially fixed. Thus magnet 10 is free to follow vibration motion, mechanical irregularities and misalignment of the workpiece without introducing adverse effects on unbalance measurement. Axial rigidity of magnet 10 maintains workpiece position in "V" blocks 4.

Figure 11:
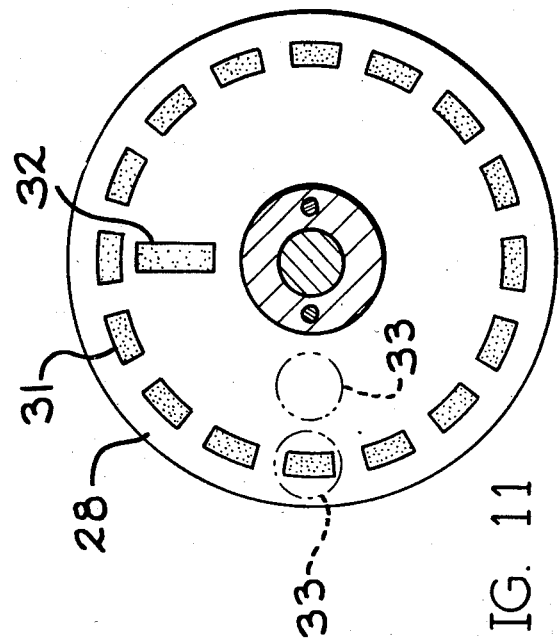
FIG. 11 is a section view taken along lines 11—11 of FIG. 9.
Figure 10:
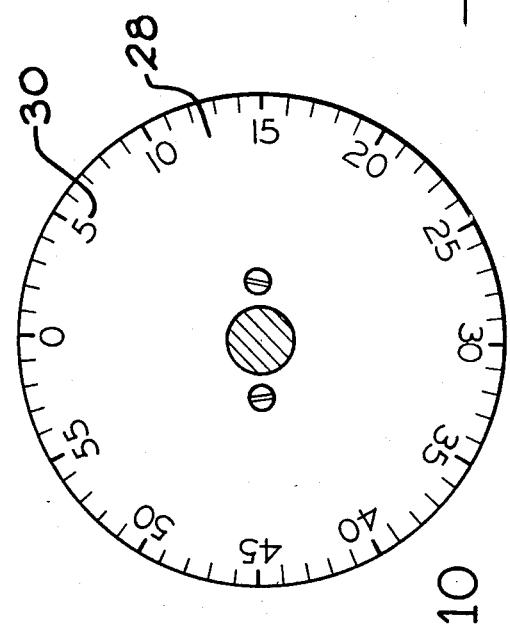
FIG. 10 is a section view taken along lines 10—10 of FIG. 9.

Circular disc 28 shown in FIG. 9 is represented in greater detail in FIGS. 10 and 11. The front face of disc 28 has circumferential graduation lines and numbers 30, shown 0-59 numbered in increments of five. A portion of disc 28 is easily visible to the machine operator by which he locates workpiece 5 unbalance corresponding to a number on the disc. The disc number 30 indicating location of unbalance is displayed by instrument 12.

The rear side of disc 28, shown in FIG. 11, contains concentric bands of segments 31 and 32. The segments may be differentiated from background as slots, protrusions, holes, contrasting colors, or by other means suitable for generating rotary encoder information. While two bands are shown, more or less may be required in particular cases. While not necessarily limited thereto, the present embodiment utilizes two bands of white segments on a black background. Two photo-type sensors 33, responsive to the contrasting reflectivity between segments and background, generate electrical pulses that are used by instrument 12 in analyzing amount and location of unbalance. Typically, the outer band of segments 31 provides rotational speed information for electronically tuning a filter and/or operating a tachometer. The inner band, shown with a single segment 32, provides positional information in determining unbalance location.

The preferred embodiment, as described above, is intended to be ememplary in nature and by no means limits the scope of modifications possible and apparent to those skilled in the art without materially departing from the intent and spirit of this invention.

What is claimed is:

1. A drill press mounting apparatus for use on a balancing machine having a longitudinally extending machine bed, comprising:
    a longitudinally extending guide member mounted on said machine bed adjacent and parallel to said balance machine;
    a second member mounted on said machine bed adjacent and parallel to said guide member and opposed to said balance machine, said second member having a top and an underside;
    a slide member supported for rotation about and longitudinal travel along said guide member and further supported for movement between a first position in contact with said underside of said second member for longitudinal travel along said second member and a second position in contact with said top of said second member for retarding longitudinal travel along said guide member and said second member; and
    a drill press positioned atop said slide member for movement of said slide member from said first position to said second position upon operation of said drill press, said drill press having its center of mass located between said balance machine and said guide member when said slide member is in said first position, the operation of said drill press generating a torque which shifts the center of mass of said drill press from a point between said balance machine and said guide member to a point between said guide member and said second member thereby causing said slide member to shift from said first position to said second position and cessation of the operation of said drill press causing said slide member to return from said second position to said first position.

2. A drill press mounting apparatus according to claim 1, wherein a friction block is attached to said slide member for contacting said top of said second member only when said slide member is in said second position.

3. A drill press mounting apparatus according to claim 2, wherein said slide member is supported for rotational and longitudinal travel along said guide member by a first low friction linear bearing.

4. A drill press mounting apparatus according to claim 3, wherein said slide member is supported for longitudinal travel along said second member by a second low friction linear bearing.

5. An automatic lock-up system for a drill press assembly on a balancing machine having a longitudinally extending machine bed comprising: a first rail mounted on the machine bed adjacent the balancing machine, a second rail mounted on the machine bed adjacent and parallel to said first rail and opposed to the balance machine, said second rail having a top and an underside, a slide operatively to connected to said first rail by a first low friction linear bearing for longitudinal movement along said first rail and rotation about said first rail, said slide being operatively connected to said underside of said second rail by a second low friction bearing for longitudinal movement along said second rail, the drill press being positioned atop said slide and over said first rail such that the center of mass of the drill press lies between said first rail and the balance machine when the drill is not in operation, and a friction block attached to said slide for contacting said top of said second rail and retarding movement of the drill press assembly along said first and second rails upon operation of the drill, the operation of the drill generating a torque which shifts said center of mass of the drill to a point between said first and second rails thereby causing said friction block to engage said top of said second rail, the cessation of the operation of the drill causing the center of mass of the drill to shift back between said first rail and the balance machine thereby causing said friction block to disengage said top of said second rail and permit longitudinal movement of the drill press assembly along said first and second rails.

* * * * *